July 17, 1956  C. B. YAKEL  2,754,614
EXPENDIBLE SINKER FOR FISH LINES
AND RELEASING MEANS THEREFOR
Filed Dec. 31, 1952

INVENTOR.
CLYDE B. YAKEL.
BY  Knox & Knox.
AGENTS.

2,754,614

EXPENDIBLE SINKER FOR FISH LINES AND RELEASING MEANS THEREFOR

Clyde B. Yakel, Grossmont, Calif.

Application December 31, 1952, Serial No. 328,994

4 Claims. (Cl. 43—43.12)

The present invention relates generally to fishing tackle and more particularly to releasable and expendible sinkers for fish lines.

The primary object of this invention is to provide a device for fish lines to facilitate a long cast without the use of a conventional sinker.

Another object of this invention is to provide a fish line sinker having means for immediate or retarded release from a fish line so that the line can be used with or without a float for surface fishing or, alternatively, the baited hook and/or lure can be carried to a greater depth before release, if the fisherman so desires.

Another object of this invention is to provide a fish line sinker having release means which is itself soluble or destructible when in contact with water.

Another object of this invention is to provide a fish line sinker combining a soluble or disposable weight and means to release said weight after casting.

Another object of this invention is to provide a fish line sinker which will not contaminate any fishing water or litter the water surface after release from a fish line.

Another object of this invention is to provide a fish line sinker which is adapted for fabrication from many different materials, so that the choice of material can be according to the dictates of availability and price considerations, the exact sizes and proportions being matters easily determined to suit particular conditions and needs.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure and wherein similar characters of reference indicate similar or identical elements and portions throughout the specification and throughout the view of the drawing, and in which:

Figures 1, 2:
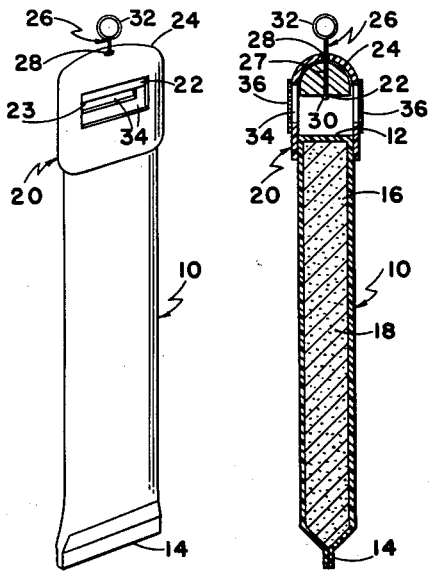
Fig. 1 is a perspective view of the device.
Fig. 2 is a longitudinal sectional view of the device.

Referring in detail to the drawing, the numeral 10 indicates a tubular body which may be of cross-sectionally oval shape. One end 12 of the body 10 has a transverse flat seal, while the other end 14 is sealed by squeezing or by application of heat or any other suitable method, which will be dictated primarily by the nature of the material used in fabricating the body. The body 10 is preferably made of gelatin or any other material which will dissolve or disintegrate slowly in water and will not contaminate or litter said water after dissolution or disintegration. The tubular space 16 within the body 10 is filled with a weighty substance 18 such as sand. Secured over the end 12 of the body 10 is the cap 20, said cap 20 being of a shape similar to the cross-sectional shape of the body 10. A plug 22 is contained within an opening 23 in the cap 20, between the closed end 24 of said cap 20 and the sealed end 12 of the body 10. The plug 22 is fabricated from any material which will immediately dissolve or disintegrate upon contact with water after the manner of an aspirin tablet. Lactose is exemplary of such material and a dispersive agent such as soda can be added, if desired. Thus the plug 22 has a faster rate of dissolution than the body 10. The plug 22 should, however, be of such character as not to pollute or litter any water in which it may be cast. The plug 22 is suitably shaped to conform closely with the inside shape of the end 24 and to fit securely therein. The pin 26 extends through the bore 27 extending longitudinally of the body 10, centrally through the plug 22 and through the hole 28 in the cap 20. The pin 26 is secured in the plug 22 and will resist any tendency to pull through said plug 22, and the head 30 at one end of the pin 26, being larger than the bore 27, provides additional security to said pin. The other end of the pin 26 is formed into a securing ring 32 which is exposed on the exterior of the cap 20. The hole 28 in the cap 20 is sufficiently large to allow the free passage of the head 30 of the pin 26. The slots 34, illustrated as rectangular, in the cap 24 are provided to expose the plug 22 to the water. Referring to Fig. 2 the numeral 36 denotes removable waterproof strips of adhesive character which are applied to the cap 20 and which completely cover the slots 34. Thus the interior of the cap 20 is completely enclosed when desired except for the hole 28.

Figure 3:
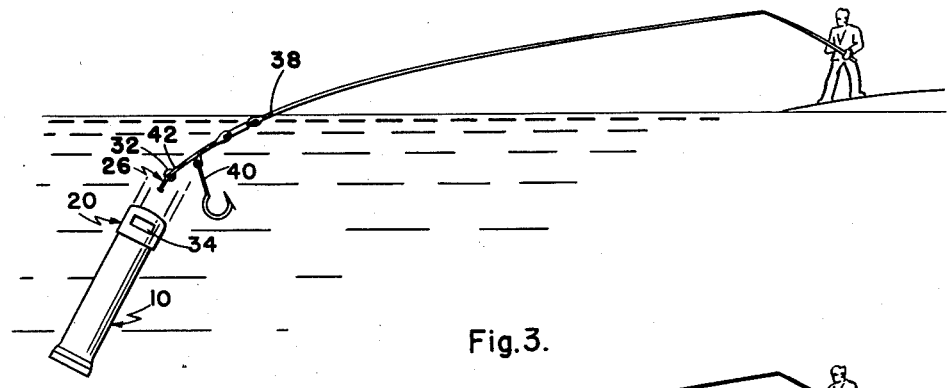
Fig. 3 is a view designed to illustrate how the device is used for near-surface fishing.

The use of my releasable sinker for surface fishing is illustrated in Fig. 3, where an ordinary type fish line or leader rig is indicated at 38. A fish hook 40 is attached in conventional manner. My releasable sinker is attached to the fish line 38 by means of a clip 42, said clip engaging the ring 32 of the pin 26. My sinker will enable the fish line 38 to be cast greater distances by reason of its weight.

Where surface fishing is being done, the strips 36 are removed from the cap 20 to expose the plug 22. When the fish line 38 is cast and my sinker strikes the surface of the water, the water enters the slots 34 and causes immediate dissolution or disintegration of the plug 22, thus releasing the pin 26. The pin 26, being attached to the fish line 38, which would tend to remain at the surface of the water is pulled clear of the cap 20 by gravity acting upon the body 10 and the cap 20. My releasable sinker continues to sink and the body 10 and the cap 20 slowly dissolve or disintegrate leaving the heavy substance 18 as a small deposit on the bed of the stream, lake or other body of water. Thus no pollution or littering of the water is possible.

Figure 4:
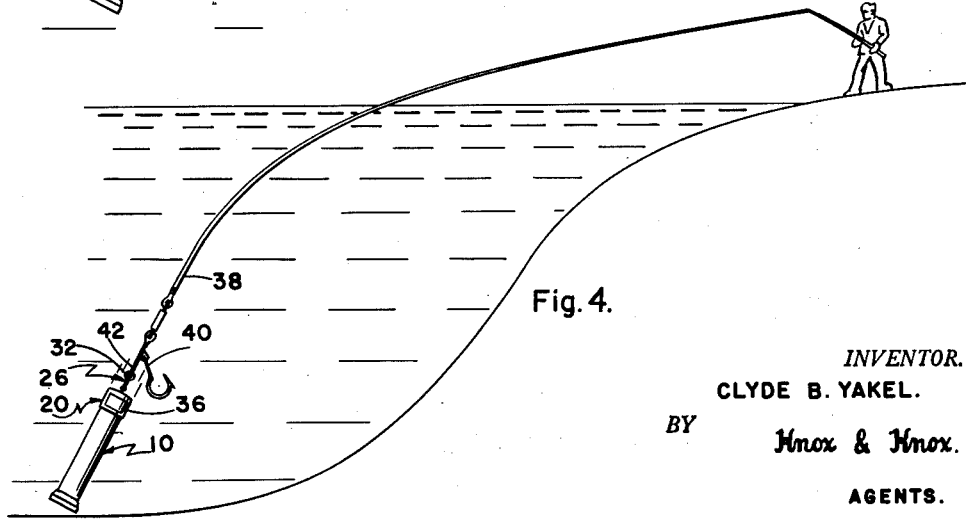
Fig. 4 is a view designed to show how the device is used for depth fishing or bottom fishing.

When fishing below the water surface as shown in Fig. 4, my releasable sinker is attached to the fish line 38 as previously described. In this instance, however, the waterproof strips 36 are allowed to remain in place to prevent the entry of any water through the slots 34. When the line 38 is cast and my releasable sinker together with the line 38 strikes the surface of the water, the water gains access to the interior of the cap 20 only by seeping through the hole 28 in said cap 20. It will be evident that the gradual entrance of water into the cap 20, by seepage, would cause relatively slow dissolution or disintegration of the plug 22, thus providing sufficient time to allow the sinker to submerge well below the water surface before said sinker is released from the fish line 38 as previously described. The fish line 38 and hook 40, along with any bait or lure, now unhampered by the sinker, are free to move naturally with the water.

My releasable sinker is ideal for use in rocky locations where a sinker of non-releasing type is liable to become lodged in underwater obstacles and cause damage to a fish line.

The operation of this invention will be clearly comprehended from a consideration of the foregoing description of the mechanical details thereof, taken in connection with the drawing and the above recited objects. It will be obvious that all said objects are amply achieved by this invention.

It is understood that minor variation from the form of the invention disclosed herein may be made without departure from the spirit and scope of the invention, and that the specification and drawing are to be considered as merely illustrative rather than limiting.

I claim:

1. In a releasable sinker, a water soluble hollow body, a weighty substance in said body, and means for releasably attaching said body to a fish line to assist in casting, said means comprising a water soluble plug carried by said body and a pin attached at one end to said plug, the other end of said pin having means for attachment to a fish line, said plug having a faster rate of dissolution than said body.

2. In an expendible sinker, a hollow body which will dissolve slowly in water, means for attachment of said body to a fish line and for releasing said body from a fish line after casting, said means comprising a soluble plug retained in said body and a pin attached at one end to said plug, the other end of said pin having means for attachment to a fish line, said body having a small channel leading from the exterior of said body to said plug and having a larger opening exposing said plug, and a removable adhesive seal closing said opening, said plug having a faster rate of dissolution than said body, the rate of dissolution of the plug being slower when said seal is not removed prior to casting.

3. In a non-polluting, non-littering and expendible sinker, a hollow soluble body, a weighty substance therein, and means for releasably attaching said body to a fish line to assist in casting, said means comprising a soluble plug carried by said body and a pin attached at one end to said plug, the other end of said pin having means for attachment to a fish line, said plug having a faster rate of dissolution than said body.

4. In a releasable sinker, a soluble body of hollow form and having an opening, a plug secured in the opening in said body, said plug being soluble in water at a faster rate than said body, a pin attached at one end to said plug and having means at the other end for attachment to a fish line so that said body will facilitate casting of a fish line, said body having a channel therein to receive said pin, said pin being loosely held in said channel and a protective water-proof element covering said opening in said body, so that water may enter said body through said channel causing gradual destruction of said plug and delayed release of said pin from said plug, said covering element being removable to adapt the sinker for more rapid release, whereby the sinker has a variable release rate.

References Cited in the file of this patent

UNITED STATES PATENTS

| | | |
|---|---|---|
| 2,271,899 | Miller | Feb. 3, 1942 |
| 2,308,238 | Baker | Jan. 12, 1943 |
| 2,329,117 | Henderson et al. | Sept. 7, 1943 |